United States Patent [19]
McIntire et al.

[11] Patent Number: 5,792,988
[45] Date of Patent: Aug. 11, 1998

[54] RADIO FREQUENCY HEAT SEALING OF CABLE ASSEMBLIES

[75] Inventors: James Francis McIntire, Boring; Larry Duane Stopper, Cornelius; Robert Lee Beckman, Beaverton; Dan Alan Vance, Portland; Daniel B. Smith, Beaverton; Bruce Alan Barney, Portland, all of Oreg.

[73] Assignee: The Whitaker Corporation, Wilmington, Del.

[21] Appl. No.: 586,570

[22] Filed: Jan. 16, 1996

[51] Int. Cl.$^6$ .................................................. H02G 15/04
[52] U.S. Cl. ........................................ 174/74 R; 174/75 B
[58] Field of Search .......................... 174/74 R, 74 A, 174/75 B, 75 C, 77 R, 135, 102 R, 102 C; 156/272.2

[56] References Cited

U.S. PATENT DOCUMENTS

| | | | |
|---|---|---|---|
| 2,727,088 | 12/1955 | Wall | 174/135 |
| 3,051,774 | 8/1962 | Schelke | 174/135 |
| 3,453,377 | 7/1969 | Gillespie | 174/75 C |
| 3,521,220 | 7/1970 | Clarke, Jr. et al. | 439/447 X |
| 3,558,397 | 1/1971 | Clark | 156/272 |
| 3,564,111 | 2/1971 | Breitenbach | 174/36 X |
| 3,911,203 | 10/1975 | Goldowsky | 174/138 F X |
| 4,210,479 | 7/1980 | Fabisiewicz | 156/273 |
| 4,251,310 | 2/1981 | Goldhaber et al. | 156/273 |
| 4,276,108 | 6/1981 | Gellantly et al. | 156/244.24 |
| 4,461,529 | 7/1984 | Fariss | 339/102 R |
| 4,539,793 | 9/1985 | Malek | 53/469 X |
| 4,547,641 | 10/1985 | Nebergall et al. | 219/10.41 |
| 4,574,173 | 3/1986 | Bennett | 219/10.53 |
| 4,628,168 | 12/1986 | Nebergall et al. | 219/10.81 |
| 4,802,947 | 2/1989 | Bartholomew | 156/380.5 |
| 4,900,389 | 2/1990 | Schnell et al. | 156/273.7 |
| 4,954,678 | 9/1990 | Harmony et al. | 219/10.43 |
| 5,030,135 | 7/1991 | Plesinger | 439/447 |
| 5,058,172 | 10/1991 | Ross et al. | 381/122 X |
| 5,093,546 | 3/1992 | Matsumiya et al. | 219/10.41 |
| 5,571,145 | 11/1996 | Drebin | 607/37 X |

FOREIGN PATENT DOCUMENTS

| | | |
|---|---|---|
| 1 203 161 | 1/1960 | France . |
| 39 11 611 C | 5/1990 | Germany . |
| 60-230829 A | 11/1985 | Japan . |
| 885 820 | 12/1961 | United Kingdom . |

Primary Examiner—Kristine L. Kincaid
Assistant Examiner—Chau N. Nguyen
Attorney, Agent, or Firm—Gerald K. Kita

[57] ABSTRACT

A cable assembly (8, 80) including an electrical cable (10) having a flexible tubular jacket (12) and a reinforcing structure (14) attached to the outside of the jacket in a smooth sealing connection (30), and a method of using radio-frequency electrical energy, applied radially through the cable jacket (12) and the reinforcing structure (14), to make the connection (30). A shield conductor (26) inside the cable jacket (14) may be used as an RF electrode, with a second RF electrode (42, 44) circumscribing a portion of the cable (12) and the reinforcing structure (14) and shaping the outer surface of the connection. The RF energy may be used instead to activate an adhesive (108). An outer electrode (118) may be embedded in the reinforcing structure (116) in one variation of the invention.

16 Claims, 3 Drawing Sheets

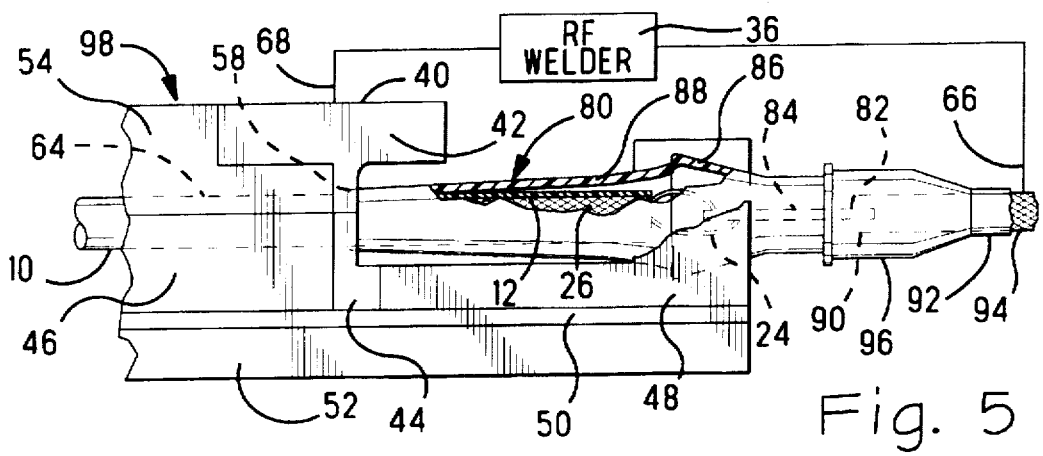
Fig. 5
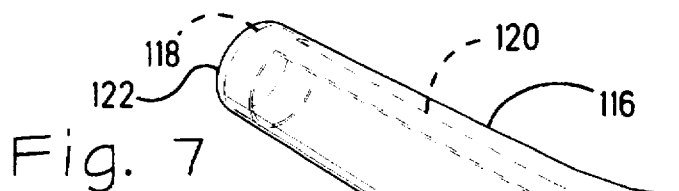
Fig. 7
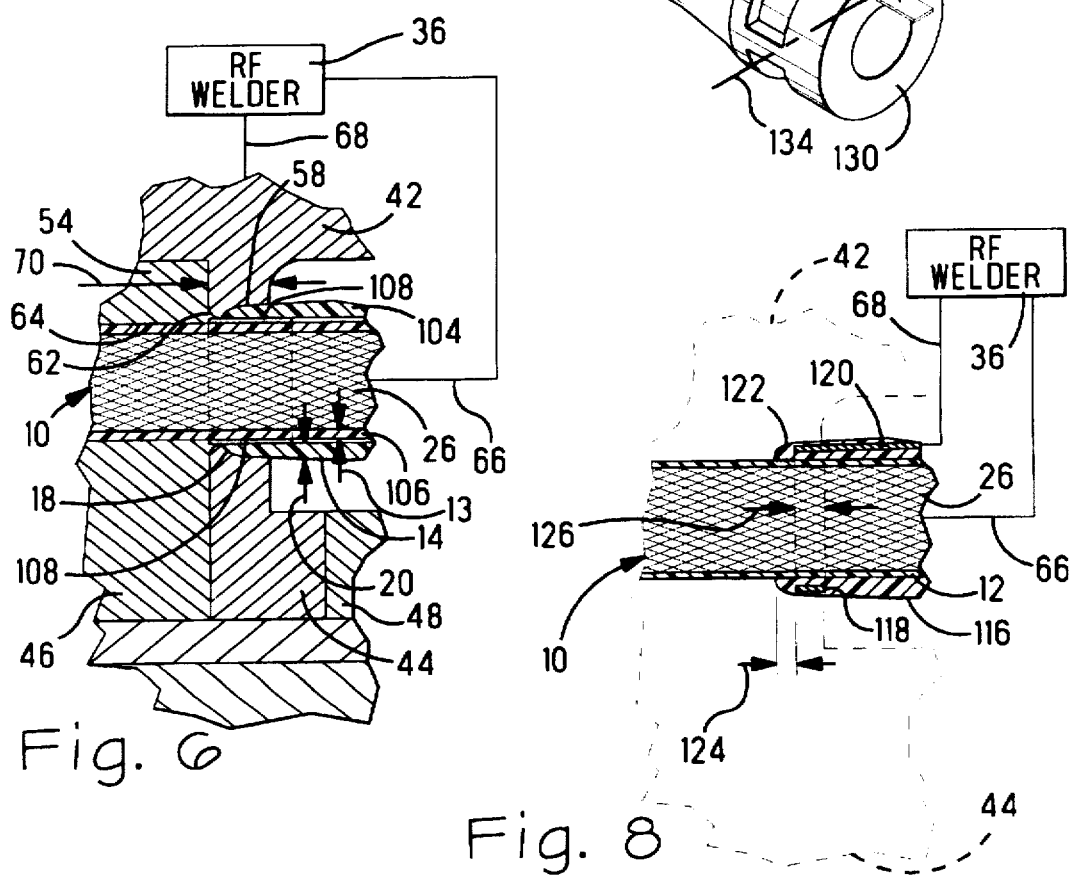
Fig. 6
Fig. 8

5,792,988

RADIO FREQUENCY HEAT SEALING OF CABLE ASSEMBLIES

BACKGROUND OF THE INVENTION

The present invention relates to use of radio frequency (RF) electrical energy to seal cable assemblies, and in particular relates to application of RF energy in a radial direction to fasten reinforcing structures to the tubular jackets of cables.

Cable assemblies for providing electrical connections to many types of equipment used in surgery may become exposed to patient body fluids, or may otherwise become contaminated. Cables could include as few as two or three electrical conductors, for use in powering electric saws or drills, a somewhat greater number of conductors, for providing power and signals to electrically illuminated probes such as in laparoscopes and arthroscopic cameras, or hundreds of conductors, for use with ultrasound probes, now being used within the human body during surgery. Such cables are often quite expensive, and so it is desirable to clean the cables so that they can be reused. To accomplish this, it is necessary to have smooth contours and to eliminate any crevices or features where blood, tissue, or other contamination might be trapped. In addition, the cable assemblies must be sealed well enough to prevent disinfectants and sterilizing fluids from seeping into the cable assembly itself.

Cable assemblies, where a connector is attached to an end of the cable, include flexible tapered boots attached to the cables to spread and carry the stresses of flexure and tension encountered near the cable end. Typically, sealing between such a flexible boot and the jacket of the cable is important for the type of cable construction commonly used. To be effective, a seal must extend around the entire circumference of the cable, between the jacket and the boot.

In the past, adhesives or O-rings have been used to form a seal between a flexible reinforcing boot and the jacket of a cable. O-rings are usually reliable, but they-must usually be located at the larger end of the boot, at the end of the cable where the boot is located, leaving it possible for contaminants to enter the small end of the boot between the interior of the boot and the outer face of the jacket. Adhesives have been used to form a seal between the interior of a boot and the jacket of a cable, but most adhesives are prone to problems such as variations in the process of forming an adhesive joint, degradation and failure of adhesives over time, and the necessity to use solvents that may be unacceptable because of the threat that they pose to people's health or the environment, generally. Additionally, adhesives may have long cure times, and the integrity of adhesive connections must be monitored carefully during the lifetime of cable having such an adhesive connection. There is thus an area at the small end of the boot that previously has not been reliably bonded or sealed to the jacket of the cable, and contaminating materials can thus become trapped between the boot and the jacket of the cable.

While polyvinyl chloride (PVC) thermoplastic is easy to bond by thermal welding, some types of thermo-plastics, including many types of polyurethane, do not typically bond together very easily with thermal welds. It has been known in the past to use heat-activated adhesive materials to join flexible plastics, in order to avoid solvent residues or to fasten together dissimilar materials, as, for example, when melting points of materials to be joined to each other are too different for thermoplastic welding to be effective or reliable. Heating an entire cable assembly in order to activate an adhesive material, however, is undesirably slow and involves an unacceptable amount of risk of damage to a cable assembly whose plastic parts are being joined by such a heat-activated adhesive.

Schnell et al. U.S. Pat. No. 4,900,389 discloses the use of RF heating to attach a seal element to the inside of a hollow tubular access port of a container such as a flexible plastic blood bag. Schnell et al. teach the application of the RF energy in an axial direction, between electrodes that encircle the tubular access port within which the seal is being fastened in place.

Similarly, Matsumiya et al. U.S. Pat. No. 5,093,546 discloses annular electrodes spaced apart from each other axially along tubes which may be of like or different sizes, to form smooth joints connecting the ends of the tubes to each other without contamination from solvents.

Harmony et al. U.S. Pat. No. 4,954,678 discloses application of RF energy in a radial direction between a mandrel and a circumscribing electrode to provide an annular weld between overlapped, concentric heat-fusible plastic tubes, as in attaching a balloon to a catheter.

Bartholomew U.S. Pat. No. 4,802,947 discloses use of a mandrel and an outer, circumscribing grounded electrode to support, fuse, extrude, and weld an end of a small catheter to the inside of a relatively thickwalled hub supported by the outer electrode.

Nebergall et al. U.S. Pat. Nos. 4,547,641 and 4,628,168 disclose the use of RF energy applied radially between a short internal electrode located within a mandrel and a relatively long tubular, axially aligned external electrode, to form a smooth-surfaced butt weld between the adjacent ends of a pair of tubular thermoplastic parts of a catheter. The short internal electrode is located within the tubular parts being joined in a position to concentrate the heat in the weld joint being formed.

Bennett U.S. Pat. No. 4,574,173 discloses RF welding of a small tube into a lumen at an end of a catheter tube of larger size. RF energy is applied to a mandrel located within the small tube and a collet is used as an outer electrode and to compress the catheter tube against the small tube, to form a secure, tight RF welded connection.

What is still needed, then, is a reliable way to fasten reinforcing members to a jacket for an electrical cable in a way which is strong, is long lasting, and eliminates cracks or crevices which might be difficult to keep clean.

SUMMARY OF THE INVENTION

The present invention overcomes the aforementioned shortcomings and disadvantages and provides a jacketed electrical cable having a strong sealed attachment of a flexible strain relief boot to a flexible thermoplastic jacket of such a cable. The invention also provides a method for sealingly attaching a fitting such as a flexible strain relief boot to the jacket of such a cable.

In a preferred embodiment a flexible strain relief boot is of thermoplastic material and is RF welded to a flexible jacket of the cable made of similar thermo-plastic material. A smaller end, or mouth, of the flexible strain relief boot is welded tightly to the outside of the jacket of the cable, with a smooth joint and without any crevices remaining between the boot and the jacket. In one embodiment of the invention the strain relief boot attached to a cable includes an annular electrode used to create an RF weld between the interior of the boot and the jacket of the cable.

In accordance with the method of the present invention, an outer electrode is placed around the mouth or smaller end of a strain relief boot so that it holds the boot snugly in place around the jacket where it is desired to form an RF weld connection of the boot to the jacket of a cable. A continuous shield conductor, surrounding the other conductors of the cable and located just inside the jacket of the cable, is used as an inner electrode.

In one version of the method a lip included in the shape of the outer electrode surrounds the very end of the boot and prevents melted thermoplastic material from running axially along the outside of the jacket of the cable, while ensuring a smooth tight sealing weld of the boot to the jacket to eliminate places where contaminants might be caught and remain between the boot and the jacket of the cable.

In another variation of the method of the present invention an RF electrical connection to the shield conductor of the cable is made through a terminal pad of a connector which is part of the cable assembly, in sealingly fastening a boot to the cable jacket.

In another version of the method according to the present invention, a fluid such as air is used to pressurize the jacket of the cable, urging it outwardly into close contact with the boot at the location of the weld joint being formed.

In yet another version of the method, RF energy is applied in a radial direction through the area where it is desired to fasten a boot to a jacket of a cable, and the heat generated by application of RF energy is utilized to activate a heat-activated adhesive to fasten the strain relief boot to the jacket uniformly and quickly, without having to heat the entire cable assembly in an oven.

In another method according to the invention, an electrode embedded within the end of the boot is utilized together with the shield conductor of the cable to cause a radial direction of application of RF energy to form a weld joint between the boot and the jacket of the cable.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 5 is a view of a portion of the RF welding fixture shown in FIG. 2, showing the manner of fastening a flexible strain relief boot that is integral with a connector cover to a cable to which an electrical connector has already been attached.

FIG. 6 is a view similar to FIG. 3, showing the attachment of a flexible strain relief boot to a jacket of a cable by the use of a heat-activated adhesive material, in accordance with the present invention.

FIG. 7 is a perspective view of a flexible strain relief boot according to the invention including an embedded electrode.

FIG. 8 is a sectional side view showing a portion of a cable with the flexible strain relief boot shown in FIG. 7 in place thereon, and schematically showing the manner of fastening the flexible boot to the jacket of the cable.

DETAILED DESCRIPTION OF THE INVENTION

Figure 1:
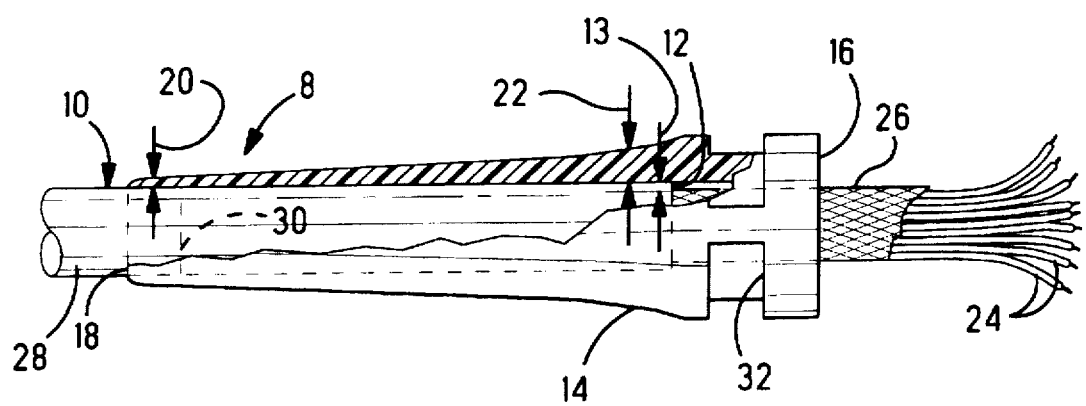
FIG. 1 is a partially sectional side elevational view of an end portion of a multi-conductor electrical cable including a strain-relief boot attached to the jacket of the cable according to the present invention.

Referring now to the drawings which form a part of the disclosure herein, in FIG. 1, a cable assembly 8 includes a multi-conductor electrical cable 10 having a flexible tubular jacket 12 of thermoplastic material such as a PVC plastic having a wall thickness 13. Attached to the cable 10 near one end of the jacket 12 is a tapered flexible strain-relief boot 14 preferably of a similar flexible plastic material. The boot 14 fits snugly about the cable 10, and the jacket 12 extends within the boot 14 toward its larger, or head, end 16. At the smaller, or mouth, end 18 of the boot 14 its wall thickness 20 is smaller than its wall thickness 22 nearer the larger end 16, so that the strain-relief boot 14 provides a graduated amount of lateral support to the cable 10, whose individual conductors 24 extend beyond the larger end 16 of the boot 14 to be connected electrically to appropriate contacts of an electrical circuit (not shown). A shield conductor 26, shown as being of braided wire, surrounds the group of individual conductors 24, which are individually insulated, as by separate thin coatings of suitable dielectric materials such as PTFE. The shield conductor 26 might alternatively be a served foil strip covering the bundle of conductors 24 contained within the jacket 12 as a substantially continuous, overall shield.

The smaller end 18 of the boot 14 is securely connected to the outer surface 28 of the jacket 12 with a tapered weld joint 30 shaped so that the smaller end 18 of the boot 14 blends smoothly into the outer surface 28 of the cable jacket 12. As a result, the boot 14 is securely connected to the jacket 12 so that the boot 14 can support tensile stress applied to the jacket 12 by moving the cable 10. Additionally, the tight weld 30, particularly at the margin of the smaller end 18, prevents collection of contaminants within the boot 14, between its interior and the exterior surface of the jacket 12, in contrast with similar cables in the prior art whose jacket 12 was sealed from the boot 14 only by O-rings near the large end of such a strain-relief boot. The weld joint 30 extends completely around the jacket 12 and the smaller end 18 of the boot 14, creating a continuous seal, so that washing the exterior of the cable assembly 8, including the boot 14, will not result in intrusion of washing solutions and solvents into the interior portions of the cable 10.

A groove 32 is provided in the larger end 16 of the boot 14 to secure the boot 14 into a housing for a circuit to which the cable 10 is electrically connected.

Figure 2:
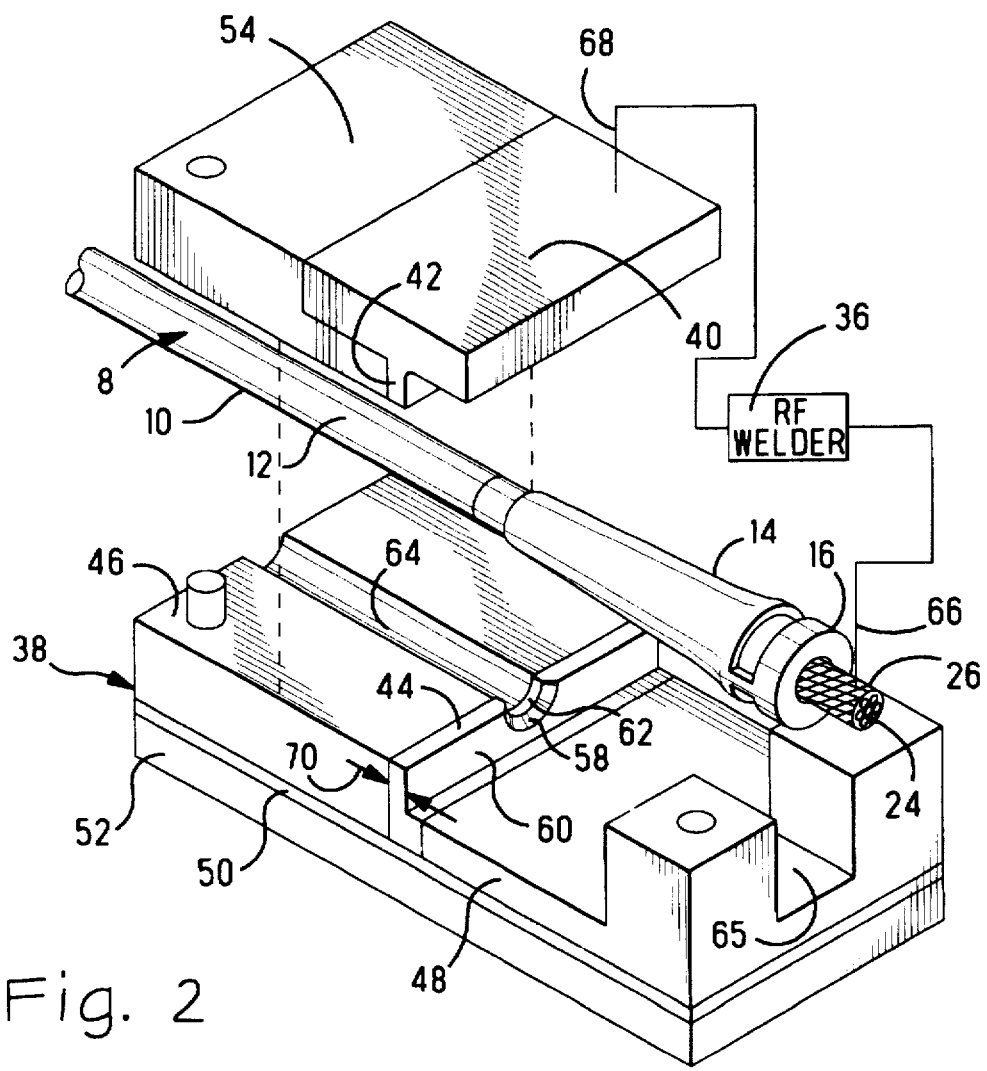
FIG. 2 is an exploded isometric view of an RF welding fixture for use according to the present invention, showing a cable with a flexible strain relief boot in position for being fastened to the cable in accordance with the invention.
Figure 3:
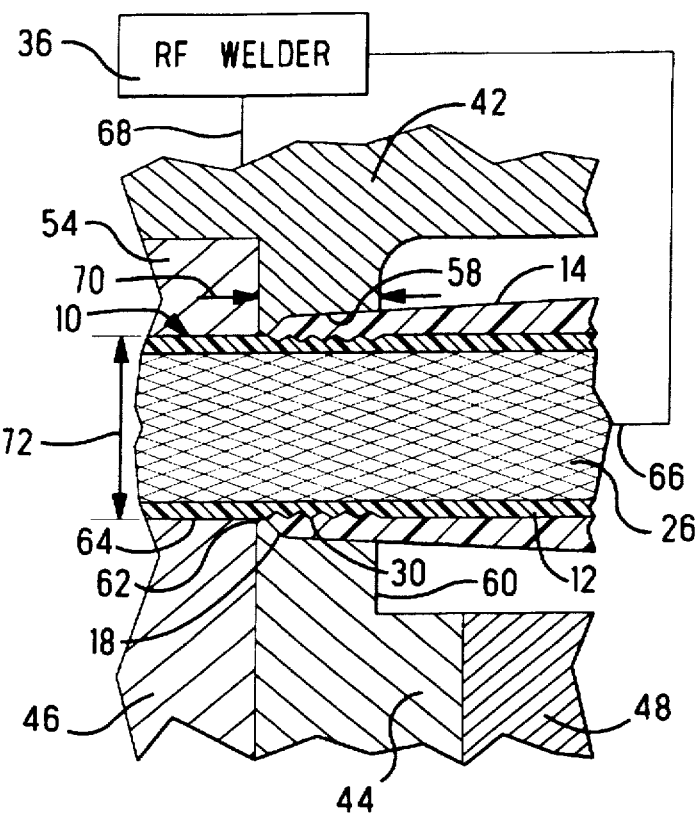
FIG. 3 is a side sectional view of a portion of the welding fixture shown in FIG. 2, showing the configuration of an outer electrode and the location of the outer electrode with respect to a cable to which a flexible reinforcing boot is being attached.

Referring now also to FIGS. 2 and 3, a welding fixture 38 is intended for use in a conventional RF welder, such as the 4KW RF welder, Model ART4/6000, manufactured by Cosmos Electronic Machine Corporation of Farmingdale, N.Y. The RF welder 36 supports the welding fixture 38 on a movable table (not shown), and provides RF energy for welding through contact with the top surface 40 of an outer electrode which is split horizontally into two portions, an upper portion 42 and a lower portion 44, each made of a suitably conductive material such as a copper alloy.

Support members 46 and 48, located alongside the lower portion 44 of the outer RF electrode, are located atop an insulating layer 50 supported, in turn, by a base 52. A retainer 54 is attached to the upper portion 42 of the outer electrode and is removable from the support member 46, together with the upper portion 42 of the outer electrode, to provide access to a channel 64 of the appropriate size to receive the cable 10 snugly. The upper and lower portions 42 and 44 of the outer electrode define a receptacle 58 which is slightly larger in diameter than the channel 64, in order to accommodate the thickness of the smaller end 18 of the boot 14. The receptacle 58 is preferably slightly tapered from a larger diameter at its side 60, facing toward the larger end 16 of the boot 14, to a smaller diameter adjacent the channel 56. The outer electrode also defines a radially inwardly-protruding lip 62 located immediately adjacent the channel 56, to seat closely against the outer surface of the jacket 12 and thus to prevent any of the material of which the boot 14 is made from flowing axially along the jacket 12 when the material of the jacket 12 and boot 14 become fluid during the process of welding the boot 14 to the jacket 12, as will be explained in greater detail presently.

The support member 48 includes a pair of upwardly-protruding blocks defining a channel 65 between them, to receive the larger end 16 of the boot 14, supporting it so that the cable 10 remains substantially straight as it extends away from the channel 56, through the receptacle 58 and the boot 14. A ground electrode 66 of the RF welder 36 is connected to the shield conductor 26 where it extends beyond the boot 14 with the cable 10 and the boot 14 held in the welding fixture 38 as shown in FIGS. 2 and 3, and an RF electrode 68 of the RF welder 36 is placed into power transmitting contact with the top 40 of the outer electrode. While the RF energy could instead be applied through the shield conductor 26 with the outer electrode connected to ground, the arrangement described has been found to produce superior results.

Preferably, the outer electrode has a dimension 70, measured axially of the cable 10, which is several times as great as the wall thickness 20 adjacent the smaller end 18 of the boot 14, but which is somewhat less than the diameter 72 of the cable 10, so that the RF energy produced by the RF welder 36 is transmitted substantially radially with respect to the cable 10, between the outer electrode, including both the upper portion 42 and the lower portion 44 which define the receptacle 58 and the shield conductor 26. The heating effect of the RF energy is thus concentrated and confined to the portions of the jacket 12 and the smaller end 18 of the boot 14 that are located within the receptacle 58 defined by the outer electrode. When the RF welder 36 is energized at the appropriate power setting and for the appropriate time, the material of the smaller end 18 of the boot 14 and the portion of the jacket 12 immediately surrounded by the receptacle 58 are heated to a high enough temperature to fuse and unite with each other, yet not hot enough to boil, and a strong thermal weld, or heat seal, is formed between the boot 14 and the jacket 12 at that location. For example, for a cable jacket of 60 durometer PVC, with an outside diameter of 0.350 inch (8.9 mm) and a wall thickness 13 of 0.030 inch (0.76 mm), and a boot 14 of similar material whose wall thickness 20 is 0.015 inch (0.4 mm), operating the welder 36 at 27.12 MHz, at an appropriate power setting of, for example, 160 watts (although it is not known how well the RF energy is coupled) for about 7 seconds produces a satisfactory seal. While the receptacle 58 is intended to be of the appropriate size to result in firm mechanical contact between the mouth of the boot and the jacket 12, the jacket may also be inflated to a slight overpressure while the materials are being heated, to ensure a good seal between the boot 14 and the jacket 12.

Figure 4:
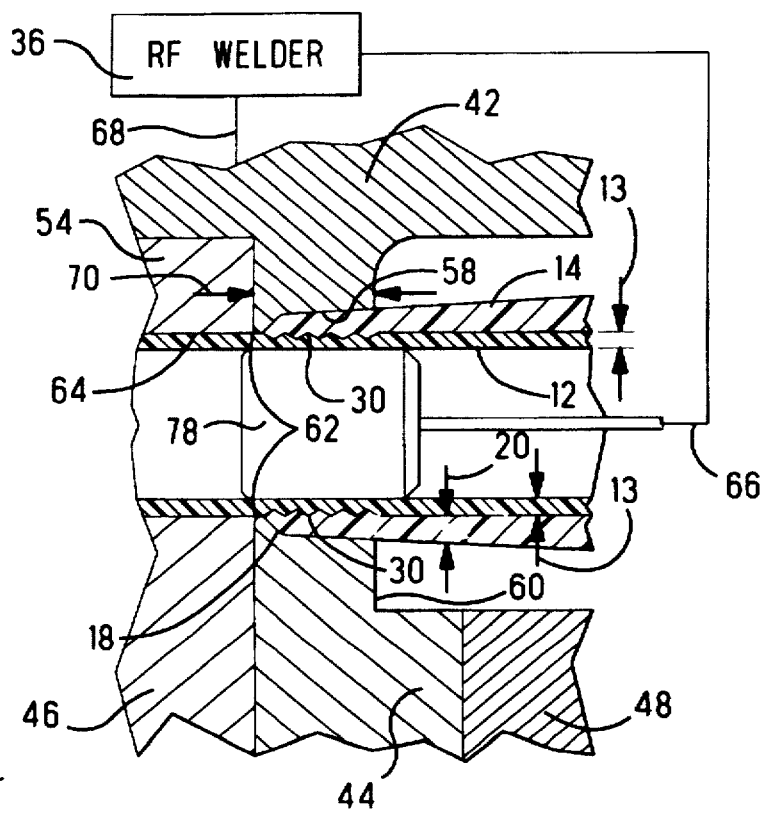
FIG. 4 is a view similar to FIG. 3, showing the use of a mandrel within a jacket for a cable as one electrode for RF welding a strain-relief boot to the jacket before installation of the jacket onto a cable.

Should it be desired to attach a reinforcing structure such as the boot 14 to a jacket 12 for a cable which will not have a substantially continuous shield conductor, attachment can be provided in substantially the same manner by inserting a mandrel 78 into the jacket 12, as shown in FIG. 4, with the ground electrode 66 of the welder 36 connected to the mandrel 78 instead of the shield conductor 26 as described above in connection with the cable 10. Once the welding operation has been completed in a manner similar to that used to weld the boot 14 to the jacket 12 of the cable 10, an appropriate cable can be placed within the jacket 12 and the jacket 12 can be installed upon such a cable using well-known methods such as pressurizing the interior of the jacket 12 to increase its size temporarily and elastically as the cable is installed inside the jacket.

Referring next to FIG. 5, a cable assembly 80 includes a cable 10 having a jacket 12 and a shield conductor 26 which is electrically connected to a card edge connector 82. The several conductors 24 of the cable are connected to a printed circuit board 84 of which the card edge connector 82 is a part. A hollow housing 86 surrounds the printed circuit board 84 and has attached to it a generally conical flexible strain relief boot portion 88 extending away from the card edge connector 82 along and surrounding a portion of the cable 10 and its jacket 12.

A female connector 90 is connected to a short cable 92 which includes a conductor such as a braided shield conductor 94, which is connected to a contact, within the female connector 90, that is located so as to mate electrically with a contact of the connector 82 which, in turn, is electrically connected to the shield conductor 26 of the cable 10. A protective housing 96 associated with the female connector 90 and the short cable 92 is of a design which exerts no force on the housing 86 when the female connector 90 is being connected to the card edge 82, so that connection of the connectors 82 and 90 with each other will not disturb the physical location of the conical strain relief boot portion 88 of the housing with respect to the cable 10. The strain relief boot portion 88 of the housing 86 can be welded to the jacket 12 of the cable 10 by connecting the ground electrode 66 of the RF welder 36 to the shield conductor 94, with the female connector 90 mated with the card edge connector 82. The cable assembly 80 is welded using the appropriate welding fixture 98, which is similar, except for specific dimensions, to the welding fixture 38 previously described.

As shown in FIG. 6, in the case of a strain relief boot 104 and a jacket 106, respectively, made of materials which are not easily thermally welded to one another, a layer 108 of a heat-activated adhesive material may be applied to the appropriate area on the outside surface of the jacket 106 or the interior surfaces of the boot 104. Bostik heat activated adhesive 7119M, a polyurethane solvent adhesive available from Bostik Incorporated, of Middleton, Mass., is a satisfactory adhesive, requiring a temperature of about 175°–195° F. (80°–90° C.) for activation. When it is desired to fasten the boot 104 to the jacket 106, the cable and boot are placed in the welding fixture 38 as shown previously in FIGS. 2 and 3, with the layer 108 within the receptacle 58 defined by the upper and lower portions 42, 44 of the outer electrode. The RF welder 36 is then activated at the appropriate power and for the appropriate length of time to heat the heat-activated adhesive of the layer 108, activating the adhesive to fasten the boot 104 to the jacket 106 securely. Preferably, the temperature of the thermoplastic material of the boot 104 is also raised high enough that it may also be molded within the receptacle 58 to join smoothly with the surface of the jacket to produce a surface which does not present cracks or crevices to collect contaminants on the outside of the cable thus prepared.

A flexible strain-relief boot 116 of a thermoplastic material, shown in FIGS. 7 and 8, is generally of the same configuration as the boot 14, for example. The boot 116 includes embedded within the thermoplastic material of which it is made an annular electrode 118 from which a long narrow electrode lead 120 extends to the larger end 130 of the boot 116, corresponding to the larger end 16 of the boot 14. The annular electrode 118 is located close to the mouth or smaller end 122 of the boot 116, being separated from it by a distance 124 of, for example, 0.050 inch (1.25 mm). The annular electrode 118 may have an axial length 126 of 0.15 inch (3.8 mm) and may be made of copper foil having a thickness of about 0.01 inch (0.25 mm). The lead 120 extends within the material of the boot 116 and protrudes from the large end 130 as a contact for connection to the RF electrode 68 of the RF welder 36, while the ground electrode 66 is connected to the shield conductor 26 of a cable 10 to which the boot 116 is to be attached. Depending upon the materials of the boot 116 and the jacket of a cable 10 to which the boot 116 is being attached, the RF welder can be energized to weld the smaller end 122 of the boot 116 to the jacket of the cable, or to activate a layer of heat-activated adhesive (not shown) as described above in connection with FIG. 6. Once the RF welder has been operated for the appropriate length of time to form the interconnection between the boot 116 and the jacket of the cable on which the boot 116 is fastened, the electrode lead 120 can be clipped close to the large end 130, as indicated by broken line 134 in FIG. 9.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. An electrical cable assembly comprising: an electrical cable having a plastic jacket concentrically surrounding a hollow shield conductor, the cable having at least one insulated conductor inside the hollow shield conductor, a plastic boot concentrically surrounding the jacket, a seal concentrically joining the jacket and a first end of the boot, an electrically conducting welding electrode contact on the hollow shield conductor protruding beyond a second end of the boot for use in formation of the seal, a portion of another welding electrode concentrically surrounding the seal, and another portion of said another welding electrode extending beyond the first end of the boot for use in formation of the seal.

2. An electrical cable assembly as recited in claim 1 wherein, the seal is a weld joint around the jacket and the first end of the boot.

3. An electrical cable assembly as recited in claim 1 wherein, the seal is a heat activated sealant layer around the jacket and the first end of the boot.

4. An electrical cable assembly comprising: an electrical cable having at least one insulated conductor inside a hollow shield conductor, said cable having a plastic jacket concentrically surrounding said hollow shield conductor, a plastic boot concentrically surrounding said jacket, a first end of said boot being concentrically joined with said jacket by an RF induced, heat activated thermal weld joint forming a seal, said hollow shield conductor providing an RF induced welding conductor to activate said thermal weld joint, said hollow shield conductor being surrounded by said jacket and said boot, a projecting portion of said hollow shield conductor projecting beyond a second end of said boot to provide an RF welding electrode contact to connect with an RF welder, said first end of said boot being joined with said jacket to provide a smoothly joined surface that is crevice free to avoid collection of contaminants.

5. An electrical cable assembly comprising: an electrical cable having at least one insulated conductor inside a hollow shield conductor and a plastic jacket concentrically surrounding said hollow shield conductor, a plastic boot concentrically surrounding said jacket of said electrical cable, a first end of said boot being concentrically joined with said jacket by an RF induced, heat activated thermal weld joint forming a seal, said hollow shield conductor providing an RF induced welding conductor to activate said thermal weld joint, said hollow shield conductor being surrounded by said jacket and said boot, a projecting portion of said hollow shield conductor protecting beyond a second end of said boot to provide an RF welding electrode contact to connect with an RF welder, a short cable, said short cable having a hollow shield conductor, and a circuit board, said circuit board being connected between said projecting portion of said hollow shield conductor of said electrical cable and said hollow shield conductor of said short cable.

6. An electrical cable assembly as recited in claim 5, and further comprising: a housing surrounding said circuit board, said boot being attached to said housing, and said projecting portion of said hollow shield conductor projecting outwardly beyond said housing.

7. An electrical cable assembly comprising: an electrical cable having at least one insulated conductor inside a hollow shield conductor, said cable having a plastic jacket concentrically surrounding said hollow shield conductor, said cable having a short cable portion and a remainder portion, a plastic boot concentrically surrounding said jacket, a first end of said boot being concentrically joined with said jacket by an RF induced, heat activated thermal weld joint forming a seal, said hollow shield conductor providing an RF induced welding conductor to activate said thermal weld joint, said hollow shield conductor being surrounded by said jacket and said boot, a projecting portion of said hollow shield conductor projecting beyond a second end of said boot to provide an RF welding electrode contact to connect with an RF welder, a housing surrounding a circuit board, said boot being attached to said housing, and said projecting portion of said hollow shield projecting outwardly beyond said housing.

8. An electrical cable assembly as recited in claim 7 wherein, the first end of the boot is joined with the jacket to provide a smoothly joined surface that is crevice free to avoid collection of contaminants.

9. An electrical cable assembly comprising: an electrical cable having at least one insulated conductor inside a hollow shield conductor, said cable having a plastic jacket concentrically surrounding said hollow shield conductor, said cable having a short cable portion and a remainder portion, a plastic boot concentrically surrounding said jacket, a first end of said boot being concentrically joined with said jacket by an RF induced, heat activated thermal weld joint forming a seal, said hollow shield conductor providing an RF induced welding conductor to activate said thermal weld joint, said hollow shield conductor being surrounded by said jacket and said boot, a projecting portion of said hollow shield conductor projecting beyond a second end of said boot to provide an RF welding electrode contact to connect with an RF welder, an annular electrode imbedded in said boot, and said annular electrode having an electrode lead extending to said second end of said boot to connect with said RF welder.

10. An electrical cable assembly comprising: an electrical cable having at least one insulated conductor inside a hollow shield conductor, said cable having a plastic jacket concentrically surrounding said hollow shield conductor, a plastic boot concentrically surrounding said jacket, a first end of said boot being concentrically joined with said jacket by a seal formed by an RF induced, heat activated adhesive layer, said hollow shield conductor providing an RF induced conductor to activate said adhesive layer, said hollow shield conductor being surrounded by said jacket and said boot, and a projecting portion of said hollow shield conductor projecting beyond a second end of said boot to provide an RF welding electrode contact to connect with an RF welder, and said first end of said boot being joined with said jacket to provide a smoothly joined surface that is crevice free to avoid collection of contaminants.

11. An electrical cable assembly as recited in claim 10 wherein, said hollow shield conductor extends through said ends of said boot.

12. An electrical cable assembly comprising: an electrical cable having at least one insulated conductor inside a hollow shield conductor, said electrical cable having a plastic jacket concentrically surrounding said hollow shield conductor, a plastic boot concentrically surrounding said jacket of said electrical cable, a first end of said boot being concentrically joined with said jacket of said electrical cable by a seal formed by an RF induced, heat activated adhesive layer, said hollow shield conductor of said electrical cable providing an RF induced conductor to activate said adhesive layer, said hollow shield conductor of said electrical cable being surrounded by said jacket and said boot, a protecting portion of said hollow shield conductor of said electrical cable projecting beyond a second end of said boot to provide an RF welding electrode contact to connect with an RF welder, and a short cable, said short cable having a hollow shield conductor, and a circuit board, said circuit board being connected between said projecting portion of said hollow shield conductor of said electrical cable and said hollow shield conductor of said short cable.

13. An electrical cable assembly as recited in claim 12 wherein, said first end of said boot is joined with said jacket to provide a smoothly joined surface that is crevice free to avoid collection of contaminants.

14. An electrical cable assembly comprising: an electrical cable having at least one insulated conductor inside a hollow shield conductor, said cable having a plastic jacket concentrically surrounding said hollow shield conductor, said cable having a short cable portion and a remainder portion, a plastic boot concentrically surrounding said jacket, a first end of said boot being concentrically joined with said jacket by a seal formed by an RF induced, heat activated adhesive layer, said hollow shield conductor providing an RF induced conductor to activate said adhesive layer, said hollow shield conductor being surrounded by said jacket and said boot, and a projecting portion of said hollow shield conductor projecting beyond a second end of said boot to provide an RF welding electrode contact to connect with an RF welder, a housing surrounding a circuit board, the boot being attached to the housing, and the projecting portion of the hollow shield projecting outwardly beyond the housing.

15. An electrical cable assembly as recited in claim 14 wherein, said first end of said boot is joined with said jacket to provide a smoothly joined surface that is crevice free to avoid collection of contaminants.

16. An electrical cable assembly comprising: an electrical cable having at least one insulated conductor inside a hollow shield conductor, said cable having a plastic jacket concentrically surrounding said hollow shield conductor, said cable having a short cable portion and a remainder portion, a plastic boot concentrically surrounding said jacket, a first end of said boot being concentrically joined with said jacket by a seal formed by an RF induced, heat activated adhesive layer, said hollow shield conductor providing an RF induced conductor to activate said adhesive layer, said hollow shield conductor being surrounded by said jacket and said boot, and a projecting portion of said hollow shield conductor projecting beyond a second end of said boot to provide an RF welding electrode contact to connect with an RF welder, and an annular electrode imbedded in said boot, said annular electrode having an electrode lead extending to said second end of said boot to connect with said RF welder.

\* \* \* \* \*